(12) United States Patent
Frank

(10) Patent No.: US 7,504,579 B2
(45) Date of Patent: Mar. 17, 2009

(54) LINE GUIDING ASSEMBLY

(75) Inventor: Tino Frank, Kitzingen (DE)

(73) Assignee: Leoni Bordnetz-Systeme GmbH, Nuremberg (DE)

( * ) Notice: Subject to any disclaimer, the term of this patent is extended or adjusted under 35 U.S.C. 154(b) by 109 days.

(21) Appl. No.: 11/603,623

(22) Filed: Nov. 22, 2006

(65) Prior Publication Data

US 2007/0084626 A1 Apr. 19, 2007

Related U.S. Application Data

(63) Continuation of application No. PCT/EP2005/005565, filed on May 23, 2005.

(30) Foreign Application Priority Data

May 24, 2004 (DE) .................. 10 2004 025 371

(51) Int. Cl.
*H01B 11/06* (2006.01)
(52) U.S. Cl. ........................................ 174/36
(58) Field of Classification Search .............. 174/68.1, 174/72 A, 110 R, 117 R, 117 F, 117 FF, 36; 439/445, 446, 447, 448
See application file for complete search history.

(56) References Cited

U.S. PATENT DOCUMENTS

| | | | | |
|---|---|---|---|---|
| 1,668,953 A | * | 5/1928 | Erickson | ...................... 174/101 |
| 3,321,571 A | * | 5/1967 | Lynch | ........................ 174/101 |
| 3,957,084 A | * | 5/1976 | Jung | ........................... 138/122 |
| 4,203,004 A | | 5/1980 | Cox | |
| 4,228,825 A | * | 10/1980 | Moritz et al. | ................ 138/120 |
| 4,801,764 A | * | 1/1989 | Ohlhaber | ................... 174/70 C |
| 5,094,552 A | * | 3/1992 | Monroe et al. | ................. 385/76 |
| 5,283,393 A | * | 2/1994 | Guginsky | ............... 174/102 R |
| 5,823,817 A | * | 10/1998 | Pyle | ........................... 439/447 |
| D406,428 S | * | 3/1999 | Pyle | ............................. D32/71 |
| 6,374,589 B1 | * | 4/2002 | Kunert et al. | ................. 59/78.1 |
| 6,573,451 B2 | * | 6/2003 | Komiya et al. | ............. 174/68.1 |
| 6,872,888 B2 | * | 3/2005 | Santelli, Jr. | ................ 174/68.1 |

FOREIGN PATENT DOCUMENTS

| | | |
|---|---|---|
| DE | 31 00 944 A1 | 8/1982 |
| DE | 85 31 182.0 | 2/1986 |
| DE | 201 13 742 U1 | 11/2001 |
| FR | 1 290 933 | 4/1962 |
| JP | 2003-264026 | 9/2003 |
| WO | WO 03/044903 A1 | 5/2003 |

* cited by examiner

*Primary Examiner*—William H Mayo, III
(74) *Attorney, Agent, or Firm*—Laurence A. Greenberg; Werner H. Stemer; Ralph E. Locher

(57) ABSTRACT

A conductor routing device is configured as a drag chain and has a supply line that is conducted in a flexible cable conduit. The routing device is configured as a one-piece component including several segments that run around the supply line and that are interconnected by reinforcement struts. The reinforcement struts are arranged in a line and form a reinforcement strip in such a way that a flexural direction is defined for the cable conduit. The routing device can be bent until the outer sides of two adjacent segments touch. The segments may be ring-shaped segments.

16 Claims, 5 Drawing Sheets

LINE GUIDING ASSEMBLY

CROSS-REFERENCE TO RELATED APPLICATIONS

This is a continuing application, under 35 U.S.C. § 120, of copending international application PCT/EP2005/005565, filed May 23, 2005, which designated the United States; this application also claims the priority, under 35 U.S.C. § 119, of German patent application DE 10 2004 025 371.4, filed May 24, 2004; the prior applications are herewith incorporated by reference in their entirety.

BACKGROUND OF THE INVENTION

Field of the Invention

The invention relates to a line guiding assembly, or a line routing device, in the form of a drag chain. A supply line, in particular an electrical cable or wire, is routed in a flexible cable guide.

Such a line guiding assembly serves the purpose of routing, in a protected manner, a supply line between two (machine) parts, which can move in relation to one another and are connected to one another via the supply line in particular for power supply purposes. The line routing device in this case surrounds the supply line and thus protects it. At the same time, the chain-like design provides length compensation in the event of a relative movement between the two parts by the two end pieces of the line routing device being displaced with respect to one another such that they are positioned one above the other.

Conventional drag chains or power-conducting chains are formed from a large number of individual identical chain links, which are connected to one another and between them enclose a cable duct, through which the supply line is routed loosely. Owing to the design as a chain, a bending direction for the supply line is determined which is defined by the orientation of the axes of rotation about which the individual chain links can be twisted with respect to one another. In order to form the drag chain, the individual chain links need to be fitted to one another. Connection parts or elements are often provided at the end of the drag chain, by means of which parts or elements the drag chain is fixed, for example, to a motor vehicle body. These end or connection elements are therefore formed as separate elements.

The supply line is in particular an electrical cable. As an alternative to this, it forms a set of cables or hoses having a plurality of individual lines, in the case of which hydraulic, pneumatic or data lines are generally also provided in addition to electrical lines. Such sets of hoses are used in particular in industrial robots. Since power is supplied to a machine part via the supply line, the latter can also be referred to as a power line and the line routing device can be referred to as a power line guide.

German utility model (Gebrauchsmuster) DE 201 13 742 U1 describes the use of a line routing device in the form of a drag chain for an industrial robot. A further field of use of the line routing device is to be regarded in particular as the automotive industry. There, it is used in particular for a sliding door wiring system, a seat wiring system, convertible roof wiring systems and tailgate or trunk lid wiring systems.

SUMMARY OF THE INVENTION

It is accordingly an object of the invention to provide a line routing device, which overcomes the disadvantages of the heretofore-known devices and methods of this general type and which is a generally improved line routing device.

With the foregoing and other objects in view there is provided, in accordance with the invention, a cable guide assembly for connecting two parts disposed to move relative to one another and connected to one another via a supply line, such as, for instance, two parts in a motor vehicle body. The invention resides in a flexible cable guide assembly, comprising:

a flexible cable guide in the form of a drag chain guiding the supply line therein and being formed to allow a relative movement between the two parts and enabling a length compensation for the supply line;

the cable guide being an integrally formed component with a plurality of segments each surrounding the supply line;

reinforcing webs connecting adjacent segments to one another, the reinforcing webs being disposed next to one another in a row substantially along a line so as to form at least one reinforcing strip defining a bending direction of the cable guide.

In other words, the objects of the invention are achieved by a line routing device in the form of a drag chain, in the case of which a supply line, in particular an electrical cable, is routed in a flexible cable guide. The cable guide is in this case an integral component, which has a plurality of segments, which surround the supply line, are spaced apart from one another and are connected to one another via reinforcing webs. The reinforcing webs are in this case arranged next to one another in a row along a line so as to form at least one reinforcing strip, with the result that a bending direction for the cable guide is defined. In the bending direction, the cable guide has a high degree of flexibility and a low flexural strength.

The cable guide is in this case in particular a cast, an injection-molded or a foamed component. Owing to the design as an integral unit, the complex fitting of the individual components is advantageously not required. Furthermore, this provides a wide variety of possible designs since the line routing device, in contrast to known drag chains, does not comprise individual identical chain links. Instead, it is possible to assign different properties to the cable guide over its length.

These advantages are achieved without the advantages of a conventional drag chain, namely protected routing of the supply line and determination of a bending direction, being impaired. In order to achieve these conventional advantages typical of drag chains, the cable guide has segments, which are in particular in the form of ring segments and are connected to one another merely via the reinforcing webs. Owing to the fact that the segments are spaced apart from one another, bending of the cable guide is made possible. In this case, if appropriate, the individual segments can be connected to one another—in addition to the reinforcing webs—via thin, flexible material bridges. These material bridges are, for example, film membranes which form during the production process.

The procedure for a production which is as simple and inexpensive as possible is preferably one wherein the supply line is inserted into a die, which is formed in complementary fashion to the cable guide, and then a suitable material is cast, injected or foamed around it so as to form the integral cable guide. Suitable materials here are the injection-molding, casting or foaming materials conventional in the plastics industry. Depending on the desired properties, the hardness, elasticity and level of resistance to external influences are set in a suitable manner by correspondingly selecting the materials or the corresponding process parameters during production.

In accordance with one preferred development, the reinforcing strip is twisted in the longitudinal direction of the cable guide, with the result that bending directions which are different over the length of the cable guide are defined. The reinforcing strip is in this case routed around the cable guide in the manner of a helical coil. As a result, bending around differently oriented bending axes is made possible over the length of the cable guide. The line routing device can therefore also in particular be used in cases wherein a complex three-dimensional line profile or movement sequence is required.

Precisely two opposite reinforcing strips are expediently provided in the case of the line routing device. These opposite reinforcing strips therefore correspond to the two lateral strips of a chain are defined by the lateral parts of the individual chain links. Owing to this design, a high degree of flexural strength is achieved in one direction, and the degree of flexural freedom in this regard is completely cancelled.

A minimum bending radius is preferably set, wherein, for this purpose, the distance between the segments and/or the shaping of the segments is selected in a corresponding manner. The segments can in this case be set variably in terms of their height, width/thickness or an inclined design etc., in order to define a desired minimum bending radius. In the bent state when the minimum bending radius is reached, adjacent segments come into contact with one another and support one another such that further bending is not possible.

The segments and/or the reinforcing webs are preferably designed differently over the length of the cable guide, with the result that different minimum bending radii are set. Owing to the fact that fixed minimum bending radii are set, the supply line is protected against an impermissible overextension.

In accordance with one preferred development, the cable guide in the form of an integral unit has a connection element at least at one end. This connection element serves the purpose in particular of fixing the line routing device, for example, to a machine part or to a body part. The connection element is therefore in particular also in the form of a fixing element or has at least integrated fixing elements, such as screw holes or latching hooks/latching pins, for example.

In order to make it possible for there to be sufficient strength in the connection region, in accordance with one expedient development provision is made for the connection element to have an in particular inserted reinforcing element, for example a stable metal or plastic plate, which can also, in addition, bear one or more fixing elements.

Expediently, the connection element is also designed such that it tightly surrounds the supply line. In particular, longitudinal water-tightness is hereby achieved. Owing to the connection element, in particular a transition between a wet region and a dry region is provided and, as a result, the dry region is protected against the ingress of moisture.

In the preferred production process of casting, injecting or foaming around the line, it is not absolutely essential that the cable guide is connected to the supply line by techniques such as soldering, bonding or welding or in a force-fitting manner. Alternatively, it is possible for the supply line to be arranged more or less such that it can move in the cable guide, owing to the selection of suitable production parameters, with the result that a relative displacement between the cable guide and the supply line is made possible, at least in certain subregions. However, a fixed connection is preferably provided between the cable guide and the supply line, at least in the region of the connection element.

In accordance with one expedient development, routing elements are provided on the cable guide which are designed to route the cable guide, for example, on a rail. This measure makes it possible to suspend the cable guide in the rail, at least with subregions, and also to route it in suspended fashion in the rail.

In order to achieve a high degree of tensile strength for the cable guide, provision is expediently made for an element having a high tensile strength to be integrated in the cable guide, in particular in the reinforcing strip. This element is, for example, a thread or string having a high tensile strength.

With the above and other objects in view there is also provided, in accordance with the invention, a drag chain assembly for connecting two parts that are movably disposed relative to one another, for example for the above-outlined cable guide assembly. The drag chain assembly comprises:

a flexible cable guide;

a supply line routed in the cable guide;

the cable guide being formed as an integral component of a plurality of segments surrounding the supply line;

reinforcing webs disposed next to one another in a row along a line and forming at least one reinforcing strip, the reinforcing strip defining a bending direction for the cable guide.

In accordance with a concomitant feature of the invention, the segments are ring segments with a cylindrical interior. The supply line fills the cylindrical interior formed by the ring segments, and the supply line has material cast, injected or foamed thereupon so as to form the cable guide.

Other features which are considered as characteristic for the invention are set forth in the appended claims.

Although the invention is illustrated and described herein as embodied in a line routing device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
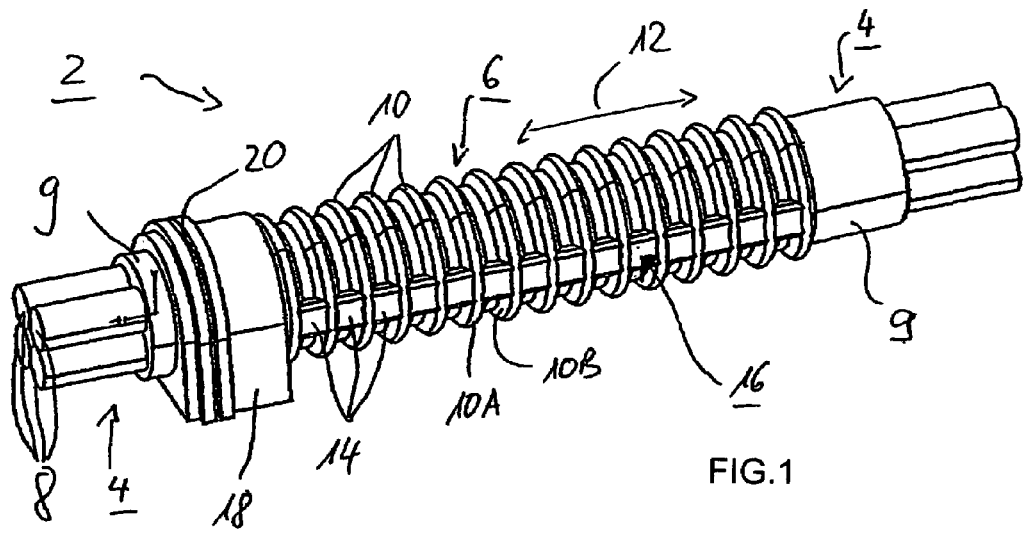
FIG. 1 is a perspective view of a line routing device having an integral cable guide with a connection element, in a stretched condition.

Referring now to the figures of the drawing in detail and first, particularly, to FIG. 1 thereof, there is shown a line routing device 2, which is formed from a supply line 4 and a cable guide 6. In accordance with the exemplary embodiments, the supply line 4 has four individual lines 8 and a sheathing 9 surrounding them. The individual lines 8 are in particular electrical cables. The sheathing 9 is, for example, a sheathed line or taping. In all exemplary embodiments, the cable guide 6 has a large number of individual ring segments 10, which in particular consist of a solid material and which surround the supply line 4 completely around the circumference. They are arranged next to one another in a row at a distance from one another in the longitudinal direction 12 of the cable guide 6. The ring segments 10 in this case each have a disk-like outer geometry 4. The ring segments 10 therefore taper towards their circumferential front side 10A. In each case inclined faces 10B adjoin one another on both sides of the front side 10A.

Adjacent ring segments 10 are in each case preferably connected to one another via precisely two reinforcing webs 14. The reinforcing webs 14 are in this case arranged such that they are offset through 180° and thus are positioned opposite one another. The reinforcing webs 14, which follow on from one another in the longitudinal direction 12, are in this case aligned along a line such that, overall, a reinforcing strip 16 is formed over the length of the cable guide 6.

Figure 2:
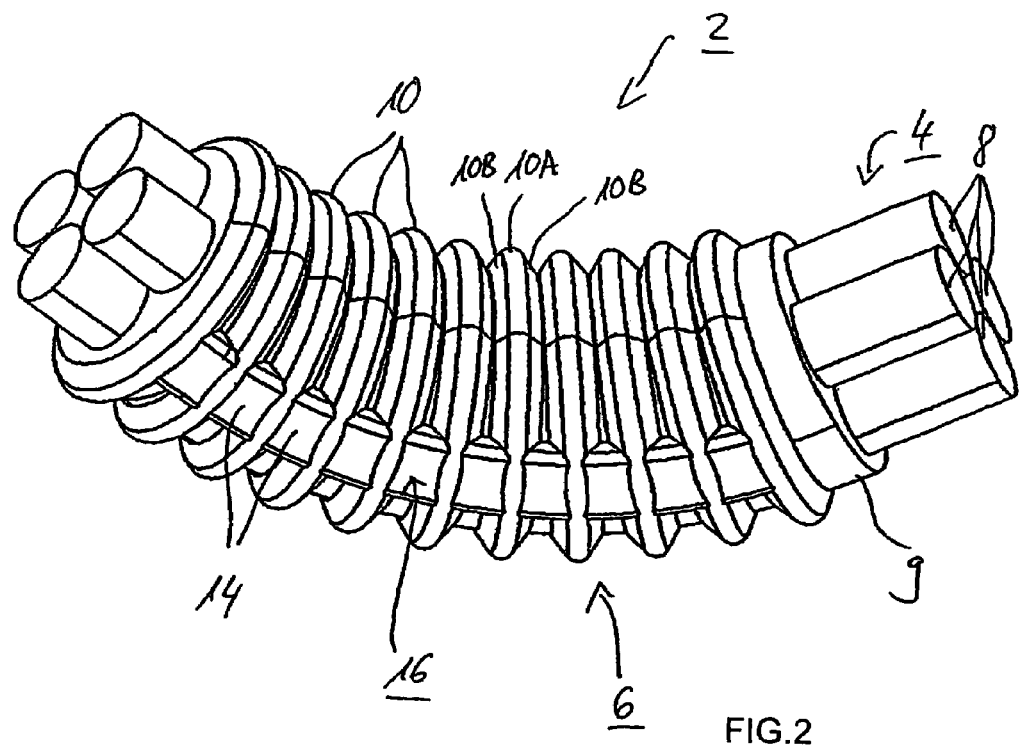
FIG. 2 shows a line routing device without the connection element, with a bent alignment.
Figure 3:
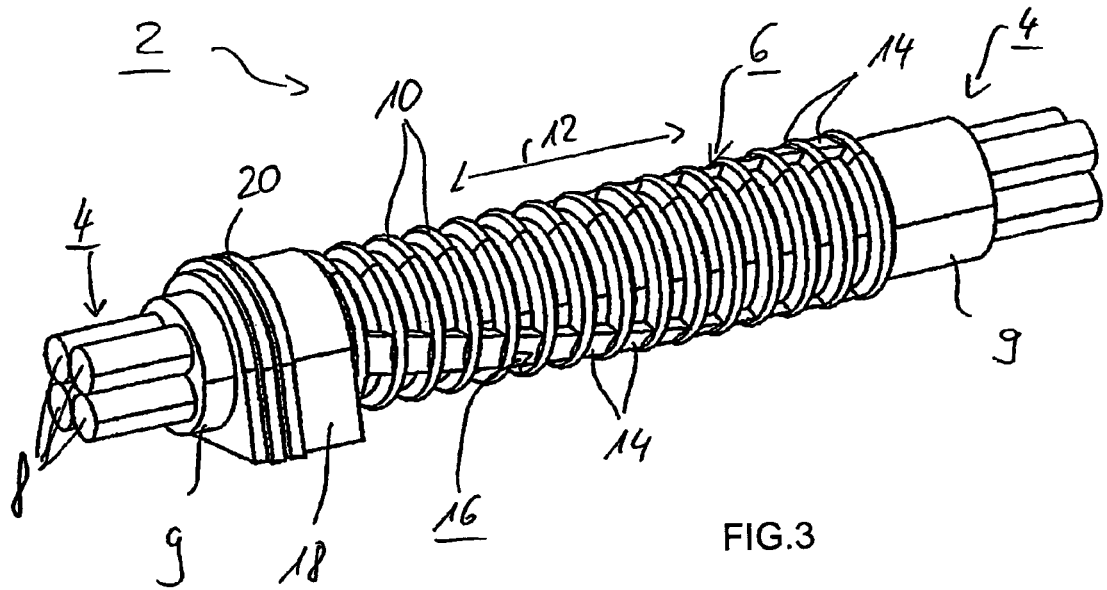
FIG. 3 shows a line routing device having an integrated connection element and a reinforcing strip which is twisted over the length of the cable guide.

Owing to the fact that the reinforcing strips 16 are arranged opposite one another, the degree of flexural freedom is restricted since the cable guide 6 cannot be compressed and cannot be extended in the region of the reinforcing strips 16. Extension or compression of the cable guide 6 is only possible in the regions wherein no reinforcing webs 14 are arranged. As a result, the bending direction of the line routing device 2 is fixed. Extension or compression is made possible by the ring segments 10, which are spaced apart from one another, until they hit against one another on the inner compression side (cf. in particular FIG. 2). Owing to this limitation, a minimum bending radius is fixed.

In order to make bending possible, the individual ring segments 10 are preferably connected to one another exclusively via the reinforcing webs 14. As an alternative to this, they are connected to one another, in addition to the reinforcing webs 14, by a thin and elastic material bridge, for example a film membrane.

In order to produce the line routing device 2, the procedure is preferably as follows: first, the sheathed supply line 4, i.e. the individual lines 8 which are enveloped by the sheathing 9, is inserted into a suitable die, which represents the negative shape for the cable guide 6. Then, the die is filled with a suitable plastic material so as to form the cable guide 6, with the result that, overall, the material is cast, injected or preferably foamed (depending on the production method selected) around the supply line 4.

Owing to the sheathing, the ingress of plastic material into the interspaces between the individual lines is prevented. This production process forms, overall, an integral cable guide 6. No further subsequent treatment or fitting steps are required. The line routing device 2 in the form of a drag chain arrangement is therefore formed in a single-stage process. As an alternative to this, it is in principle also possible first to produce the cable guide 6 and only then to route the supply line 4 through the cable guide 6. In this case, the latter is designed, for example, such that it can be swung open, with the result that the supply line 4 can be inserted from the side. The first-mentioned variant with material being injected/cast/foamed around the supply line 4 is the preferred variant since, in this case, the production complexity is low. In particular, this production method is suitable for making available prefabricated installation units.

The production method in particular involving foaming material around the supply line 4 so as to form the integral cable guide 6 provides a very high degree of flexibility in terms of possible designs of the cable guide 6. In particular, a wide variety of functions can be integrated in the cable guide 6 as early as during manufacture, by means of suitable shaping. It is particularly advantageous here that the shaping can be varied over the length of the cable guide.

For example, in some exemplary embodiments the cable guide 6 has a connection element 18 which is integrally connected to the ring segments 10, as is illustrated in FIGS. 1, 3, 5, 6 and 7. In this case, the connection element 18 is in the form of a multifunctional connection unit, which is firstly envisaged for being fixed to a machine or body part. The connection element 18 secondly also serves the purpose at the same time of sealing two spaces off from one another, which spaces are separated by the connection element 18. In order to provide this sealing and also fixing function, the connection element 18 has a circumferential groove 20, which is in the form of a sealing and fixing groove. In the final, installed position, a corresponding tongue on the machine part engages in this groove. At the same time, the individual lines 8 are embedded in the casting, injection-molding or foam compound in the region of the connection element 18 and are therefore sealed off, with the result that longitudinal watertightness is also ensured along the individual lines 8. The individual lines 8 are in this case preferably held fixed in position in the connection element 18.

A further connection element (not illustrated in any more detail here) is preferably provided at the second end of the cable guide 6, which second end is opposite the connection element 18. This further connection element may have an identical design to the connection element 18.

In the exemplary embodiments shown in FIGS. 3 and 4A-4C, the reinforcing strips 16 are twisted about the circumference of the cable guide 6 in the manner of partial helices in the longitudinal direction 12. The first and the last ring segment 10, which are adjacent to the connection element 18 and the further connection element 22, respectively, are in this case offset through an angle of rotation with respect to one another, which angle is approximately 90° in the exemplary embodiments in FIGS. 3 and 4a-4c. Since the bending direction is fixed by the reinforcing strips 16, this measure results in the bending direction being changed over the length of the cable guide 6. In the case of an angle of rotation of 90°, the bending direction wherein the line routing device 2 can be bent is therefore twisted through 90°. Overall, this makes it possible to implement complex three-dimensional routing systems, as can be seen from the illustrations in FIGS. 4A, 4B, 4C.

Figure 5:
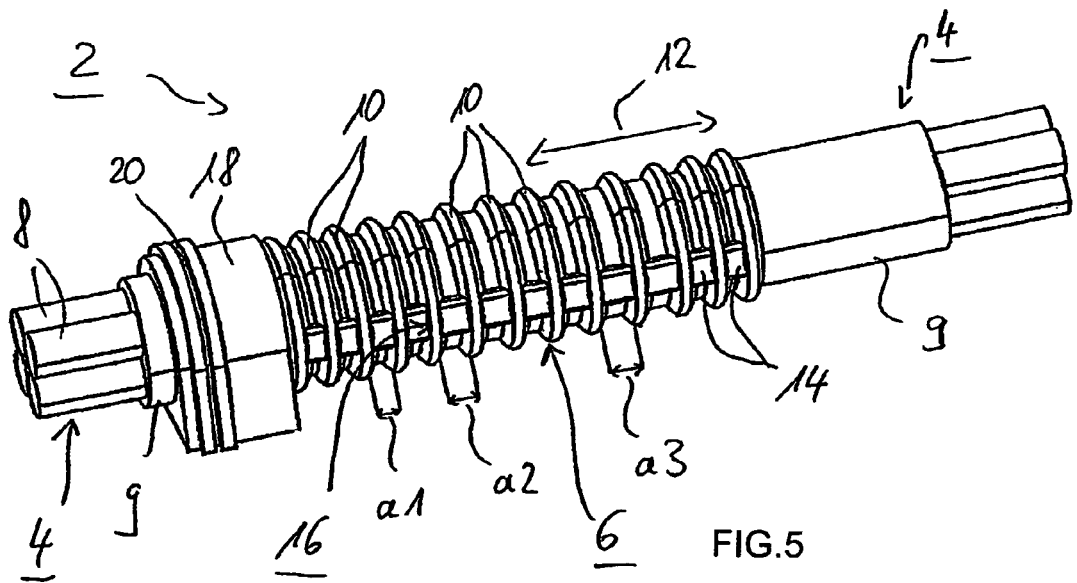
FIG. 5 shows a line routing device, in the case of which individual segments of the cable guide are spaced apart at different distances from one another.
Figure 4A:
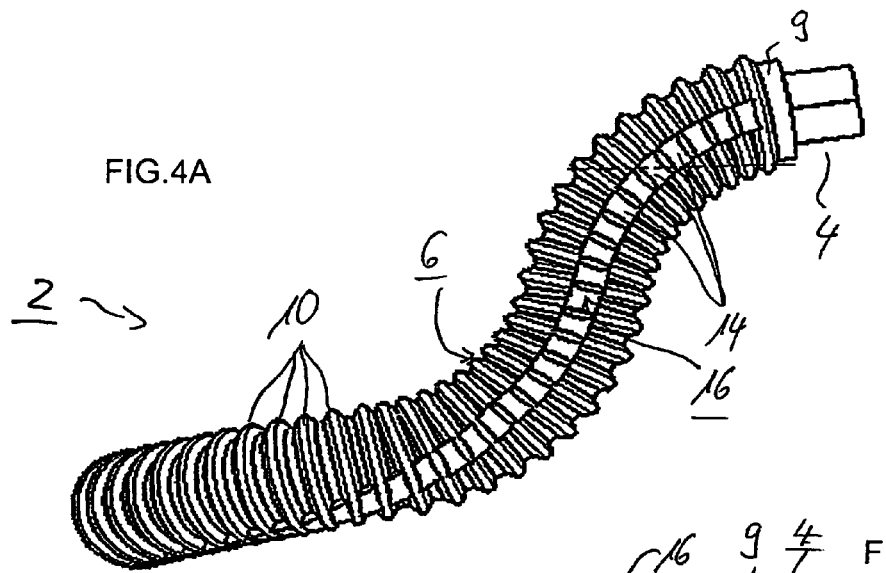
FIG. 4A-4C show line routing devices having line strips which are twisted over the length of the cable guide, in the bent state, the cable guide being bent about different bending axes.
Figure 4B:
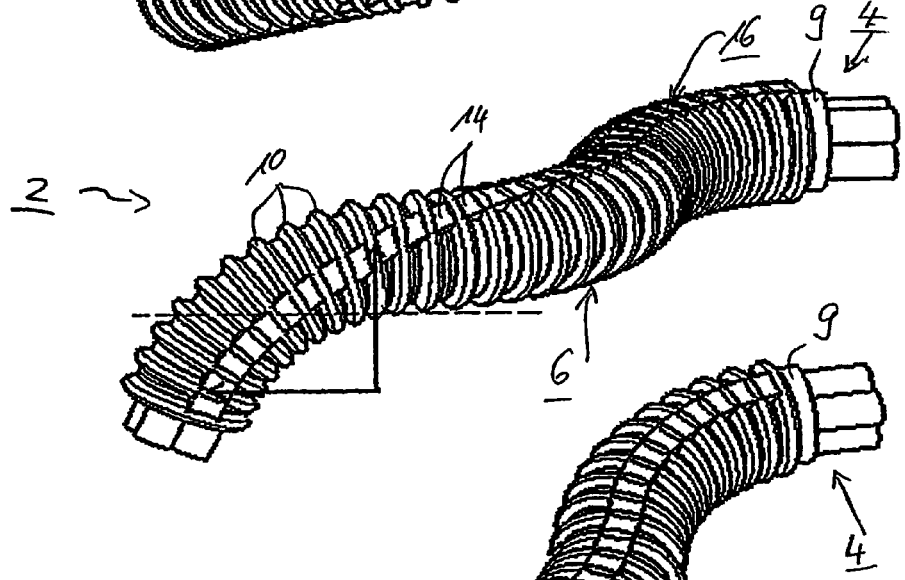
Figure 4C:
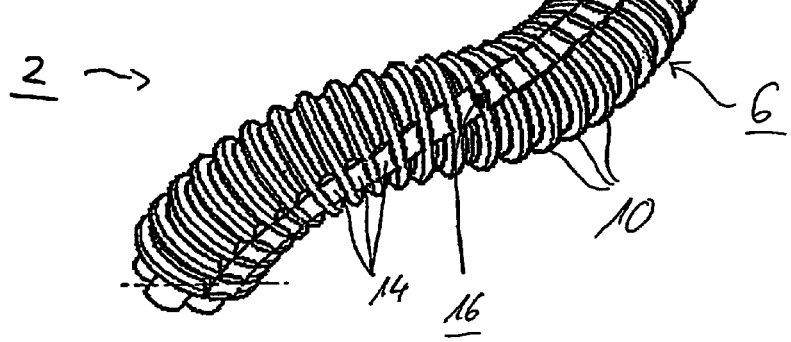
Figure 6:
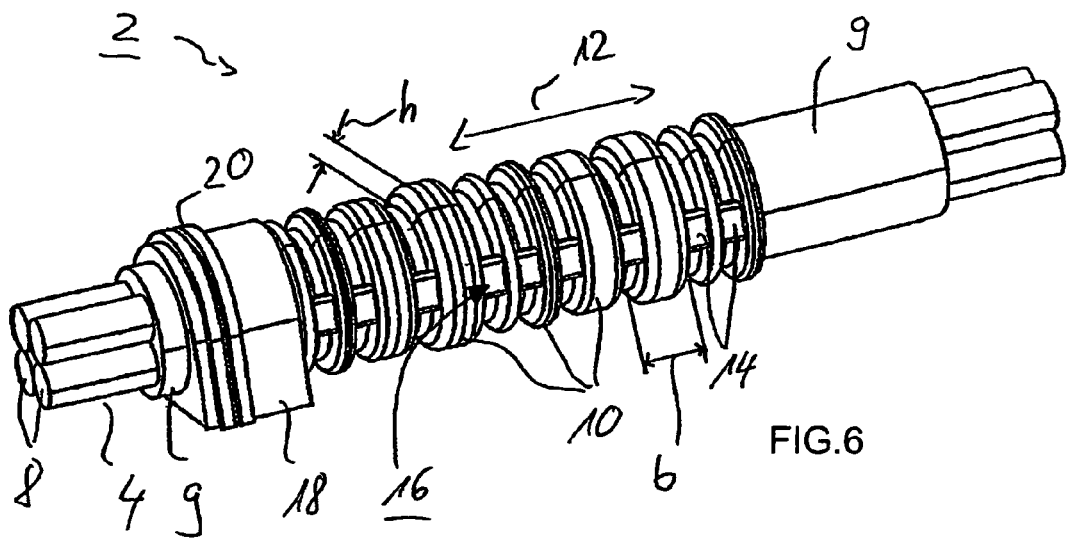
FIG. 6 shows a line routing device, in the case of which the segments are designed to be different in terms of their width, height and shape.

In accordance with the exemplary embodiments in FIGS. 5 and 6, adjacent ring segments 10 have different distances a1, a2, a3 or the individual ring segments 10 have different designs. Owing to the variations as regards the distances and/or the shaping, variable properties can be set in particular over the length of the cable guide 6. It is particularly possible to set the minimum bending radius by means of these measures. This minimum bending radius is essentially determined by means of the bending radius at which adjacent ring segments 10 are supported on one another. This is affected by the selection of the different distances a1, a2, a3 and/or the selection of different heights h of the individual ring segments 10 and/or the selection of different widths b of the ring segments 10 and/or the selection of different shapes of the ring segments 10. As regards the shape, in this case there is in particular one possible variant as regards the angle at which the inclined faces 10B are arranged.

Figure 7:
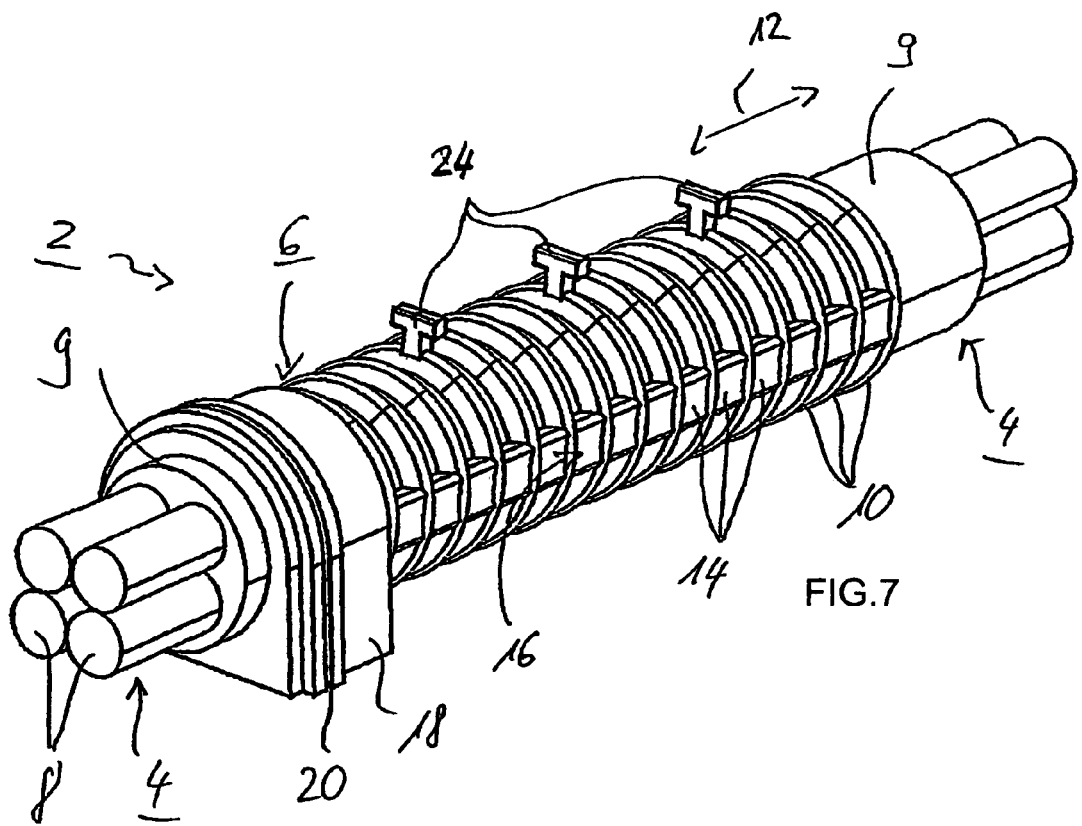
FIG. 7 shows a line routing device having routing elements integrally formed on the cable guide.

In the exemplary embodiment in FIG. 7, routing elements 24 are provided on the outside of a plurality of ring elements 10. These routing elements 24 are in this case, when viewed in cross section, approximately T-shaped and serve the purpose of hooking into a guide rail, which is formed, for example, by a slotted U rail. Owing to the routing elements 24, it is therefore possible to displace the line routing device 2 as a whole or in subregions along a guide rail also in suspended fashion. In the exemplary embodiment, the routing elements 24 are rotationally offset through 90° with respect to the line strips 16.

In one advantageous embodiment of the invention, an element having a high tensile strength is also provided so as to increase the tensile strength of the cable guide 6, which element is integrated in the cable guide 6. In particular, this element having a high tensile strength is formed by one or more threads or strings having a high tensile strength, which are expediently integrated in the reinforcing strips 16.

Figure 8:
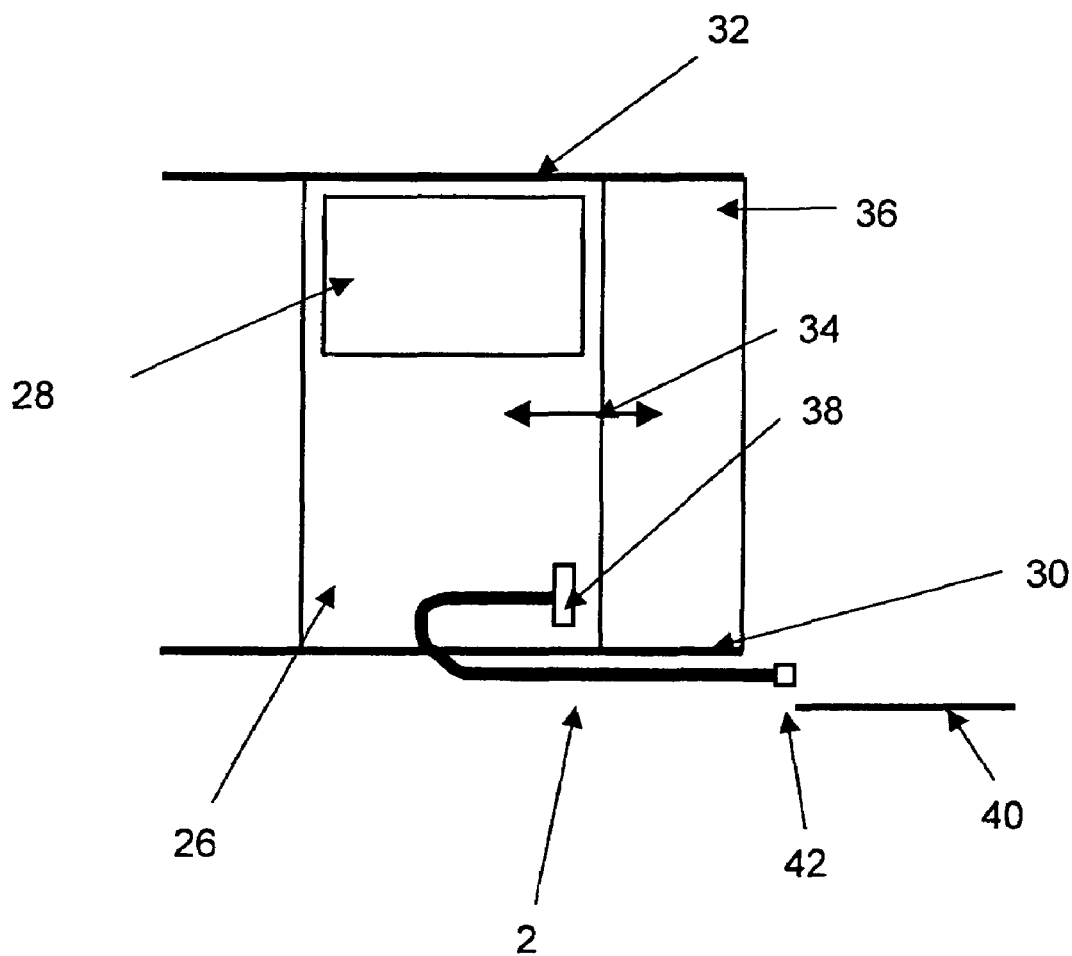
FIG. 8 is a diagram illustrating the line routing device according to the invention in a sliding door assembly.

The invention is particularly suited for automobile parts and the cable guide 6 may contain therein supply lines for a sliding door wiring system, a seat wiring system, a convertible roof wiring system, a tailgate wiring system, or a trunk lid wiring system. That is the relatively movable parts may be members of a sliding door assembly, a seat system, a convertible roof assembly, a tailgate assembly, or a trunk lid assembly, to name a few. FIG. 8 shows, in a highly diagrammatic illustration, a sliding door assembly with a sliding door 26 having a viewing window 28. The door 26 is supported in a lower guide rail 30 and an upper guide rail 32. The door 26 is disposed to slide along the rails 30 and 32 in a closing/opening direction indicated by the arrow 34. As the door 26 is moved it opens/closes an opening 36.

The routing device 2 according to the invention connects a consumer 38 in the door (e.g., a motor) to an electrical supply line 40 of the on-board electrical system. The guide assembly with the cable guide 6 may be provided with a harness connector 42 at which it is connected to the on-board harness 40 and it may be plug-connected or hard-wired at the consumer 38.

I claim:

1. In an apparatus having two parts disposed to move relative to one another and connected to one another via a supply line, a flexible cable guide assembly, comprising:
    a flexible cable guide in the form of a drag chain guiding the supply line therein and being formed to allow a relative movement between the two parts and enabling a length compensation for the supply line;
    said cable guide being an integrally formed component with a plurality of segments each surrounding the supply line;
    reinforcing webs connecting adjacent said segments to one another, said reinforcing webs being disposed next to one another in a row substantially along a line so as to form at least one reinforcing strip defining a bending direction of said cable guide.

2. The apparatus according to claim 1, wherein the two parts are parts of a motor vehicle body.

3. The apparatus according to claim 2, wherein the two parts are members of, and the supply line forms a part of a wiring system for, a sliding door assembly, a seat system, a convertible roof assembly, a tailgate assembly, or a trunk lid assembly.

4. The apparatus according to claim 1, wherein said cable guide is a cast, injection-molded or foamed component.

5. The apparatus according to claim 1, wherein said cable guide is a material cast, injected or foamed around the supply line.

6. The apparatus according to claim 1, wherein said reinforcing strip is twisted in a longitudinal direction of said cable guide.

7. The apparatus according to claim 1, wherein said reinforcing strip is one of exactly two, mutually opposite reinforcing strips.

8. The apparatus according to claim 1, wherein said cable guide has a minimum bending radius defined by at least one of a spacing distance between said segments and a shape of said segments.

9. The apparatus according to claim 8, wherein said cable guide is defined with a plurality of different minimum bending radii over a length of said cable guide.

10. The apparatus according to claim 1, wherein said cable guide is formed with a connection element at least at one end thereof, together with said cable guide forming an integral cable guide unit.

11. The apparatus according to claim 10, wherein said connection element tightly surrounds the supply line.

12. The apparatus according to claim 1, which comprises routing elements disposed on said cable guide for routing the cable guide.

13. The apparatus according to claim 1, which comprises an element having a relatively high tensile strength integrated in said cable guide.

14. The apparatus according to claim 13, wherein said element is a reinforcing strip.

15. A drag chain assembly for connecting two parts movably disposed relative to one another, comprising:
    a flexible cable guide formed as a drag chain;
    a supply line routed in said cable guide;
    said cable guide being formed as an integral component of a plurality of segments surrounding said supply line;
    reinforcing webs disposed next to one another in a row along a line and forming at least one reinforcing strip, said reinforcing strip defining a bending direction for said cable guide.

16. The drag chain assembly according to claim 1, wherein said segments are ring segments with a cylindrical interior, said supply line fills said cylindrical interior formed by said ring segments, and said supply line has material cast, injected or foamed thereupon so as to form said cable guide.

* * * * *